(12) United States Patent
Nakamura

(10) Patent No.: US 7,675,757 B2
(45) Date of Patent: Mar. 9, 2010

(54) DC-DC CONVERTER

(75) Inventor: Kazutoshi Nakamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/447,115

(22) Filed: Jun. 6, 2006

(65) Prior Publication Data
US 2006/0279965 A1 Dec. 14, 2006

(30) Foreign Application Priority Data
Jun. 8, 2005 (JP) .................. P2005-168375

(51) Int. Cl.
H02M 3/00 (2006.01)
H02M 7/00 (2006.01)
(52) U.S. Cl. .......................... 363/15; 363/13
(58) Field of Classification Search ................. 315/224, 315/307–308; 323/280, 281, 282; 363/13, 363/15, 19, 21.01
See application file for complete search history.

(56) References Cited
U.S. PATENT DOCUMENTS

| 4,975,820 | A | | 12/1990 | Szepesi | 363/21 |
| 5,610,503 | A | * | 3/1997 | Fogg et al. | 323/283 |
| 6,169,336 | B1 | * | 1/2001 | Hayashi et al. | 307/10.1 |
| 6,225,794 | B1 | * | 5/2001 | Criscione et al. | 323/283 |
| 6,249,111 | B1 | * | 6/2001 | Nguyen | 323/282 |
| 6,611,132 | B2 | * | 8/2003 | Nakagawa et al. | 323/284 |
| 6,683,797 | B2 | * | 1/2004 | Zaitsu et al. | 363/16 |
| 6,806,775 | B2 | * | 10/2004 | Abe | 330/297 |
| 6,809,560 | B1 | * | 10/2004 | Wrathall | 327/108 |
| 6,930,473 | B2 | * | 8/2005 | Elbanhawy | 323/282 |
| 2005/0088159 | A1 | * | 4/2005 | Itohara | 323/284 |
| 2007/0018591 | A1 | * | 1/2007 | Noguchi et al. | 315/308 |

FOREIGN PATENT DOCUMENTS

| JP | 2001-245469 | 9/2001 |
| JP | 2002-10627 | 1/2002 |

* cited by examiner

Primary Examiner—Douglas W Owens
Assistant Examiner—Minh D A
(74) Attorney, Agent, or Firm—Oblon, Spivak, McClelland, Maier & Neustadt, L.L.P.

(57) ABSTRACT

Disclosed is a DC-DC converter including: a first switching element ON/OFF controlling a current fed from a primary side to a secondary side; a second switching element provided in parallel to the first switching element, controlled at a substantially same timing as an ON/OFF timing of the first switching element and being lower in current rating than the first switching element; and a resistance inserted and connected between a node of a primary side of the second switching element and the primary side of the first switching element.

18 Claims, 4 Drawing Sheets

DC-DC CONVERTER

CROSS-REFERENCE TO RELATED APPLICATIONS

This application is based upon and claims the benefit of priority from the prior Japanese Patent Application No. 2005-168375, filed on Jun. 8, 2005; the entire contents of which are incorporated herein by reference.

BACKGROUND

1. Field of the Invention

The present invention relates to a DC-DC converter which lowers a primary direct-current voltage to output a secondary side voltage, and in particular, relates to a DC-DC converter using current detection to generate a shutdown timing signal for an internal switching device.

2. Description of the Related Art

Miniaturization of apparatuses has become increasingly common year by year, and in power supply circuits, miniaturization and greater efficiency have been requested. In order to miniaturize a power supply circuit, it is important to make passive elements small, which is possible by making the switching frequency high. When a power supply circuit is configured with discrete semiconductor elements, it is impossible to operate at high speed due to inductance and the like coming from wiring in a wiring board and bonding wires. It is possible to reduce these influences significantly by configuring a DC-DC converter with a one-chip device.

Meanwhile, there is a DC-DC converter having a structure to detect current in an inductor provided on the output side and shut down (OFF) an internal switching device when the peak value of the current reaches a reference value (so-called current mode DC-DC converter). Here, when voltage fluctuation on the load side is fed to generate the reference value, the response as a DC-DC converter becomes favorable.

In the current mode DC-DC converter, current detection in the inductor is almost indispensable, but if a resistor is inserted to the inductor in series for this purpose, efficiency is badly affected. In other words, since current flowing to a load flows through this resistor, it is necessary to reduce the resistance value in order to limit loss. When the resistance value is made small, the generated voltage drop becomes small, which makes the current detection difficult. There is also parasitic inductance in the detected resistance, and this parasitic inductance causes more than a little error.

A related DC-DC converter is disclosed, for example, in the following Patent Document 1. In the disclosed DC-DC converter, current detection does not rely upon the resistor connected to the inductor in series, and therefore, in the sense of reduction of loss generated in the detection resistance, the disclosed converter is improved to some extent compared with an ordinary current mode DC-DC converter.

[Patent Document 1] JP-A 2001-245469 (KOKAI)

SUMMARY

A DC-DC converter relating to an aspect of the present invention includes: a first switching element ON/OFF controlling a current fed from a primary side to a secondary side; a second switching element provided in parallel to the first switching element, the second switching element being ON/OFF controlled at a substantially same timing as an ON/OFF timing of the first switching element and being lower in current rating than the first switching element; and a resistance inserted and connected between a node of a primary side of the second switching element and the primary side of the first switching element.

DETAILED DESCRIPTION

Explanation of Embodiments

Figure 1:
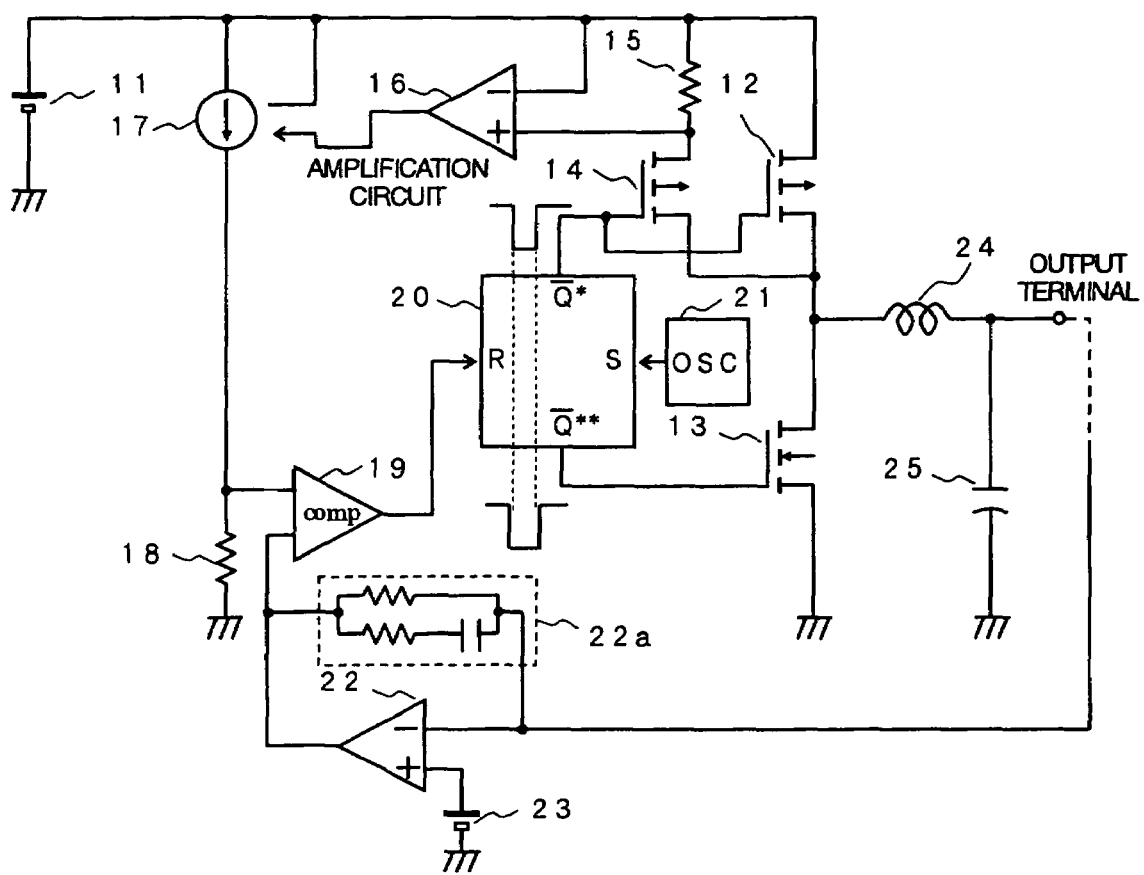
FIG. 1 is a circuit diagram showing a configuration of a DC-DC converter relating to an embodiment of the present invention.

Although the embodiments of the present invention will be described with reference to drawings, these drawings are provided only for the purpose of illustration, and are to restrict the invention in no respect.

According to a DC-DC converter relating to one mode of the present invention, a second switching element is provided in parallel to a first switching element which ON/OFF controls current fed from a primary side to a secondary side, and a resistance is inserted and connected between a node of a primary side of the second switching element and the primary side of the first switching element. Therefore, during current detection, a portion of the current fed to the secondary side (load) flows through the resistance. Accordingly, the drop in efficiency incurred during current detection can be kept to small.

As a form of an embodiment, it is possible to further include a third switching element connected between a node of the secondary side of the first switching element and a ground and able to be ON/OFF controlled in nearly reverse phase to the ON/OFF timing of the first switching element. By turning the third switching element on when the first switching element is off, it is possible to keep the loss small without interruption of load current by low ON-resistance of the third switching element.

As a form, it is also possible to further include: a voltage detection circuit configured to detect a voltage developed across the resistance relative to a voltage of the primary side; a voltage-current conversion circuit generating a current according to a magnitude of the detected voltage; a current-voltage conversion circuit generating, according to a magnitude of the generated current, a voltage from a reference voltage; and a shutdown timing signal generation circuit connected to the current-voltage conversion circuit, and configured to generate a signal transferring the first switching element and the second switching element to an off state when the generated voltage reaches a prescribed voltage. This is a concrete configuration example to perform off-timing control of the first switching element and the second switching element.

Here, it is possible that the current-voltage conversion circuit is a resistor connected between the voltage-current conversion circuit and the reference voltage. It is an easily configurable example as the current-voltage conversion circuit.

Furthermore, it is also possible here to further include: a first dummy circuit provided in a vicinity of the voltage detection circuit and having a substantially same configuration as the voltage detection circuit; a second dummy circuit provided in a vicinity of the voltage-current conversion circuit, having a substantially same configuration as the voltage-current conversion circuit, and connected to the first dummy circuit modeled after a connection relation between the voltage detection circuit and the voltage-current conversion circuit; a third dummy circuit provided in a vicinity of the current-voltage conversion circuit, having a substantially same configuration as the current-voltage conversion circuit, and connected to the second dummy circuit modeled after a connection relation between the voltage-current conversion circuit and the current-voltage conversion circuit; and a voltage correction circuit configured to correct the voltage generated by the current-voltage conversion circuit with a voltage generated by the third dummy circuit and to conduct the corrected voltage to the shutdown timing signal generation circuit. According to such a configuration, it is possible to efficiently remove noise possible to be generated in the voltage detection circuit, the voltage-current conversion circuit, the current-voltage conversion circuit, and inputs and outputs thereof with a voltage outputted by the third dummy circuit. This is suitable for the case where a DC-DC converter is configured with one semiconductor chip and where noise generation is inevitable.

Further, as a form of an embodiment, it is possible that both the first switching element and the second switching element are p-channel MOSFETs, and drains thereof are connected to the secondary side. The p-channel MOSFET is an example.

Still further, as a form of an embodiment, it is possible that both the first switching element and the second switching element are MOSFETs and a difference in the current rating is defined by their channel widths. It is possible for the MOSFETs to realize devices provided with uniform characteristics except having a desired difference in current rating by varying the channel width (varying the size).

As a yet further form, it is possible to further include: an analogue-digital conversion circuit sensing a voltage developed across the resistance with reference to a voltage of the primary side as a digital value; a digital-analogue conversion circuit converting the digital value to an analogue signal; and a shutdown timing signal generation circuit connected to the digital-analogue conversion circuit, and generating a signal transferring the first switching element and the second switching element to an off state when the analogue signal reaches a prescribed voltage. By utilizing a digital signal in some portion, it is possible to prevent the influence of noise which may occur in the case of an analogue signal.

Here, it is possible to further include a level shift circuit to level shift an output signal of the analogue-digital conversion circuit representing the digital value, wherein the digital-analogue conversion circuit performs digital-analogue conversion of a signal obtained by the level shift. Thereby, the generation of a digital signal in a suitable level as an input to the digital-analogue conversion circuit becomes possible with a simple configuration.

As a form of an embodiment, it is possible to include: a first analogue-digital conversion circuit sensing a voltage developed across the resistance with reference to a voltage of the primary side as a first digital value; a second analogue-digital conversion circuit comparing a voltage of output side of the DC-DC converter with a reference voltage to perform analogue-digital conversion of a comparison result signal, and outputting a second digital value; a compensation module to output a third digital value by weighing addition of the second digital value in a time direction; a subtractor subtracting the first digital value from the third digital value to output a subtracted value; an ON-time calculation module determining a value of a duty ratio to turn the first switching element and the second switching element on, based on a distribution in a time direction of the subtracted value; and a digital PWM module ON/OFF controlling the first switching element and the second switching element based on a value of the duty ratio. This is a configuration to perform ON/OFF control of the first switching element and the second switching element by digital PWM. Though a portion performing digital processing increases, it is more suitable to a semiconductor manufacturing process in a case of an IC. Further, it is possible to reduce the influence of noise by making the circuit digital.

Here, it is possible to further include a level shift circuit to level shift an output signal of the first analogue-digital conversion circuit representing the first digital value, wherein the subtractor outputs the subtracted value obtained by subtracting a signal obtained by the level shift from the third digital value. Thereby, it is possible to generate a digital signal at a suitable level for subtraction in a subtractor in simple formation.

Based on the above, hereinafter, embodiments of the present invention will be explained with reference to drawings. FIG. 1 is a circuit diagram showing a configuration of the DC-DC converter relating to one embodiment of the present invention. As shown in FIG. 1, the DC-DC converter includes a p-channel MOSFET 12 as a first switching element, a p-channel MOSFET 14 as a second switching element, an n-channel MOSFET 13 as a third switching element, a current detection resistance 15 as a resistance, an amplification circuit 16 as a voltage detection circuit, a voltage controlled current source 17 as a voltage-current conversion circuit, a resistor 18 as a current-voltage conversion circuit, a comparator 19, an ON/OFF control signal generation circuit 20, an oscillator 21, an error amplification circuit 22, a phase compensation circuit 22a, a reference voltage source 23, an inductor 24, and a capacitor 25. The comparator 19, the ON/OFF control signal generation circuit 20, the error amplification circuit 22, the phase compensation circuit 22a serve also as a shutdown timing signal generation circuit, which will be described later.

A connection node between the inductor 24 and the capacitor 25 is an output terminal (secondary terminal) as a DC-DC converter, and a primary supply source 11 connected to a source terminal of the p-channel MOSFET 12 is an input side source to the DC-DC converter. A load (not shown) is connected to the output terminal and the voltage applied thereon is, for example, +1.5 V, while the voltage of the primary supply source 11 is, for example, +12 V. It is possible to establish a voltage ratio of the input side to the output side with a switching (chopping) duty ratio of the p-channel MOSFET 12.

When the p-channel MOSFET 12 is kept in the OFF-state, the n-channel MOSFET 13 provided between the drain side of the p-channel MOSFET 12 and the ground is, on the contrary, controlled in the ON-state, so that an output current to a load via the inductor 24 is not interrupted when the p-channel MOSFET 12 is OFF. Generally, the n-channel MOSFET 13 can be replaced with a diode whose anode is connected to the ground, but the usage of a MOSFET reduces ON-resistance to make a low loss DC-DC converter.

The inductor 24, one end of which is connected to a drain of the p-channel MOSFET 12, and the capacitor 25 connected between the other end of the inductor 24 and the ground forms a low pass filter. An output voltage applied to a load (not shown) via the low pass filter is conducted to one of the inputs of the error amplification circuit 22 directly or via a suitable voltage division circuit as feedback.

In the error amplification circuit 22, an error in voltage of that conducted from a load side from that of the reference voltage source 23 is detected and the voltage for this error is amplified at a high gain. Thus amplified voltage is conducted as one of inputs of the comparator 19. It should be noted that the phase compensation circuit 22a is added to the error amplification circuit 22 as shown in the drawing. This is for ensuring the stability of the DC-DC converter having a feedback loop. Voltage from the ground level generated in the resistor 18 is supplied to the other input of the comparator 19. The comparator 19 generates a signal rising from a zero level when voltage generated in the resistor 18 exceeds the above-described one input voltage of the comparator 19. The output of the comparator 19 is supplied to an R (reset) input of the ON/OFF control signal generation circuit 20.

An oscillating output from the oscillator 21 is supplied to the ON/OFF control signal generation circuit 20 as an S (set) input. The ON/OFF control signal generation circuit 20 is designed to be in a set state when a signal from the oscillator 21 rises, and to be in a reset state when a signal from the comparator 19 rises. The Q* bar output of the ON/OFF control signal generation circuit 20 is supplied to both gates of the p-channel MOSFETs 12 and 14 as the first and second switching elements. The Q** bar output of the ON/OFF control signal generation circuit 20 is supplied to a gate of the n-channel MOSFET 13 as the third switching element.

The reason why not a Q* output of the ON/OFF control signal generation circuit 20 but the Q* bar output thereof is conducted to both gates of the p-channel MOSFETs 12 and 14 is because these gates are in a low state when turned on. The somewhat strict timing relation between the Q* bar output and the Q bar output is such that the period in the low state of the Q bar output is a little longer so as to include the low state of the Q* bar output as shown in the drawing. It thereby becomes possible to prevent current from passing through the p-channel MOSFETs 12 and 14, and the n-channel MOSFET 13 (so as to prevent the occurrence of a short period). These Q* bar output, and Q** bar output can be generated inside the ON/OFF control signal generation circuit 20 if the supplied S input and R input are suitably delayed and so on.

The p-channel MOSFET 12 and the p-channel MOSFET 14 are connected in parallel, and their gates and drains are in common connection. The p-channel MOSFET 12 and the p-channel MOSFET 14 are transistors different in current rating from each other, and more concretely, for example, the p-channel MOSFET 14 is narrower in channel width. It is possible to establish a current ratio at the time of on-state according to the channel width by connecting these two transistors as shown in the drawings. In other words, it is possible to establish the current ratio to be nearly the ratio of channel width.

The current detection resistance 15 is inserted and connected between a primary node (source) of the p-channel MOSFET 14 and a source of the p-channel MOSFET (namely a primary supply source 11). In other words, the p-channel MOSFET 14 and the current detection resistance 15 are especially provided as a current sense circuit. Voltage generated across the current detection resistance 15 is amplified differentially in the amplification circuit 16 with reference to the voltage of the primary supply source 11. By such amplification, a value of resistance of the current detection resistance 15 can be minimum. Furthermore, it is possible to remove factors which disturb coordinated operation between the p-channel MOSFET 12 and the p-channel MOSFET 14 (when the current detection resistance 15 is too large, voltage difference between the gate and the source of the p-channel MOSFET 12 largely differs from that of the p-channel MOSFET 14). It should be noted that the current detection resistance 15 can be, for example, several tens Ω.

Amplification output of the amplification circuit 16 is supplied as a voltage input of the voltage controlled current source 17. At the voltage controlled current source 17, the voltage input is current converted with reference to voltage of the primary supply source 11. The current flows into the resistor 18. The opposite side of the current input terminal of the resistor 18 is connected to the ground (an example of a reference voltage), and the current flowing into the resistor 18 is current voltage converted with reference to the ground. The output voltage obtained is supplied to the other input of the comparator 19.

As above, an outline of the configuration is explained, but the explanation thereof will be further continued. An output of the error amplification circuit 22 is, for example, the same as the voltage of the reference voltage source 23 in average, in a steady state. The same level of voltage as the reference voltage source 23 is inputted into one side of the comparator 19. On this state, the p-channel MOSFET 12 and the p-channel MOSFET 14 are turned on, and in a process of current increase by the inductor 24, the following occur: voltage generated across the current detection resistance 15 gradually increases→output voltage of the amplification circuit 16 gradually decreases→current of the voltage controlled current source 17 gradually increases→voltage generated across the resistor 18 gradually increases.

When the voltage generated across the resistor 18 becomes larger than the input voltage of one side of the comparator 19, the ON/OFF control signal generation circuit 20 is in a reset state, a Q* bar output is in a high state, and the p channel MOSFET 12 and the p channel MOSFET 14 are transitioned to an OFF-state. Note that transition to a set state of the ON/OFF control signal generation circuit 20 is a point of a rising edge of the signal from the oscillator 21. By ON/OFF cycle of the p-channel MOSFET 12 and the p-channel MOSFET 14 as above, a step-down voltage as a DC-DC converter is generated at the output terminal.

Feedback to the error amplification circuit 22 of an output side voltage is designed on purpose so that the voltage is equal to voltage of the reference voltage source 23. In other words, when these become nearly equal, average output voltage of the error amplification circuit 22 becomes, for example, the same as the voltage of the reference voltage source 23 due to the high gain amplification of the error, therefore such an operation as explained above is generated. It should be noted that, for example, when the output voltage as the DC-DC converter is transiently lower than a prescribed defined voltage, the output voltage of the error amplification circuit 22 becomes higher than normal, so that the rising of the output of the comparator 19 becomes later than usual. In other words, on state of the p-channel MOSFET 12 and the p-channel MOSFET 14 continues long as things go on, and they operate so as to output the prescribed defined voltage as a DC-DC converter as soon as possible. This is improvement in response.

The p-channel MOSFET 12 and the p-channel MOSFET 14 are nearly the same in ON/OFF timing. Further, these current ratios are designed to be smaller at the side of the p-channel MOSFET 14 to which the current detection resistance 15 is connected. Accordingly, it is possible to reduce current flowing in the current detection resistance 15, and it becomes possible to very effectively restrain efficiency lowering as a DC-DC converter due to resistance to detect current.

Figure 2:
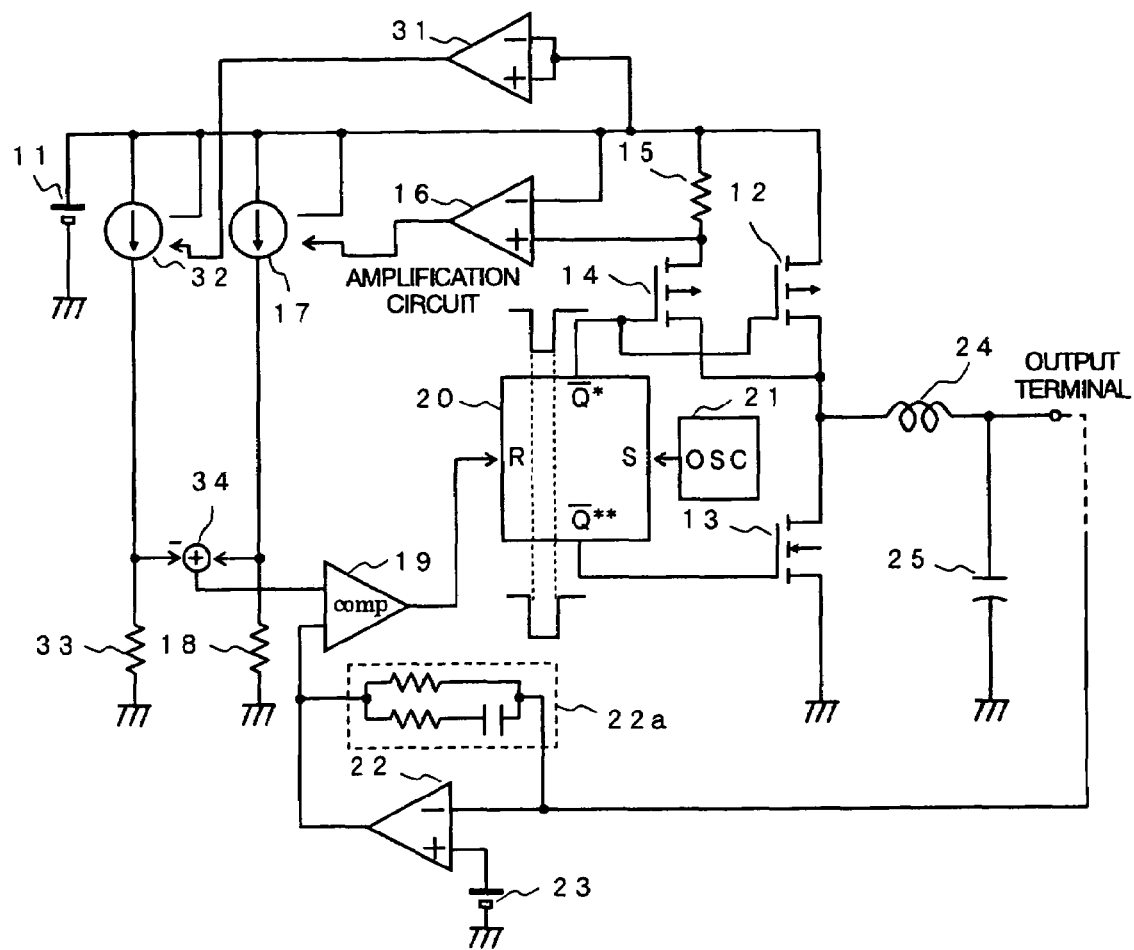
FIG. 2 is a circuit diagram showing a configuration of a DC-DC converter relating to another embodiment of the present invention.

Next, a DC-DC converter according to another embodiment of the present invention will be explained with reference to FIG. 2. FIG. 2 is a circuit diagram showing a configuration of a DC-DC converter according to another embodiment of the present invention. In FIG. 2, the same symbols are attached to elements explained already and the explanation thereof will be omitted.

In the present embodiment, a dummy amplification circuit 31 as a first dummy circuit, a voltage controlled current source 32 as a second dummy circuit, a resistor 33 as a third dummy circuit, and a subtraction circuit 34 as a voltage correction circuit are added as configuration elements. The intention to add these configurations is to remove noise superimposed on voltage between both terminals of the resistor 18. Since a node of the voltage generation side of the resistor 18 is somewhat high in impedance, when, for example, the DC-DC converter is structured in a semiconductor device with one chip, oscillation output from the oscillator 21 and the like may sometimes capacitively or inductively couple and superimpose on the node of the voltage generation side of the resistor 18 as noise. In addition, since there may exist other unaccountable causes of noise generation in the path from an input side of the amplification circuit 16 to the resistance 18 via the voltage controlled current source 17, a noise superimposes on the node of the voltage generation side of the resistor 18.

Accordingly, a configuration having the amplification circuit 31, the voltage controlled current source 32, and the resistor 33 which have the same configuration as the amplification circuit 16, the voltage controlled current source 17, and the resistor 18, are arranged extremely close to these elements, so that similar noise is purposely generated between both ends of the resistor 33. That is, the amplification circuit 31, the voltage controlled current source 32, and the resistor 33 are a noise detection circuit. Here, in the amplification circuit 31, the differential input ends thereof are shorted to be connected to the node of the power source 11 side of the current detection resistance 15 in order to obtain the same input reference as the amplification circuit 16. Then, in a subtraction circuit 34, voltage generated in the resistor 33 is subtracted from voltage generated in the resistor 18 to remove the influence of noise. The voltage obtained by removing the noise is newly conducted into the comparator 19. According to such a configuration, it becomes possible to perform ON/OFF control (especially off control) of the p-channel MOSFET 12 and the p-channel MOSFET 14 without influence of the noise.

Figure 3:
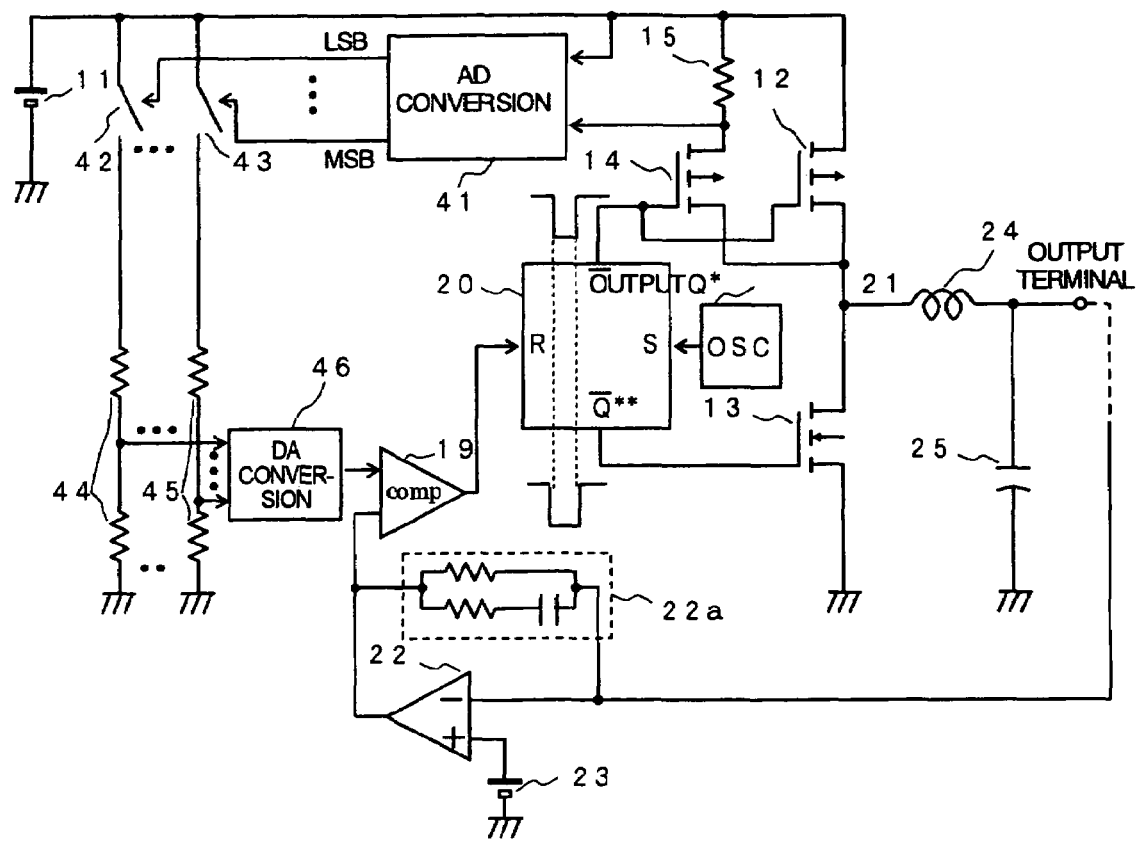
FIG. 3 is a circuit diagram showing a configuration of a DC-DC converter relating to still another embodiment of the present invention.

Next, a DC-DC converter according to still another embodiment of the present invention will be explained with reference to FIG. 3. FIG. 3 is a circuit diagram showing a configuration of the DC-DC converter according to still another embodiment of the present invention. In FIG. 3, the same symbols and numbers are put to elements already explained, and explanation thereof will be omitted.

A difference between the present embodiment and that shown in FIG. 1 is using an analogue-digital conversion circuit 41, switches 42 and 43, voltage division circuits 44 and 45, and a digital-analogue conversion circuit 46 in place of the amplification circuit 16, the voltage controlled current source 17, and the resistor 18, to generate a signal conducted to an input on one side of the comparator 19.

The switches 42, 43, and the voltage division circuit 44, 45 are level shift circuits having a reference voltage being the ground voltage (an example of the reference voltage). The division circuits 44 and 45 use the function of voltage division by resistors in this embodiment. The switches 42 and 43 turn on or off respectively according to high/low of each output bit of the analogue-digital conversion circuit 41. As a practical matter, the output of the analogue-digital conversion circuit 41 is generally "n" bits, and the level shift circuits formed with the switch 42 (43) and the division circuit 44 (45) are provided numbering the same number as this "n".

According to the configuration, since the output of the analogue-digital conversion circuit 41 is digital, an anti-noise characteristic is extremely enhanced. In other words, even when analogous noise is superimposed on the digital signal, the digital-analogue conversion circuit 46 generates an accurate analogue signal based on the inputted digital value. Accordingly, it is possible to perform ON/OFF control (especially off control) of the p-channel MOSFET 12 and the p-channel MOSFET 14 without influence of noise.

Note that it is needless to say the level shift circuit (formed with the switches 42, 43 and the voltage division circuits 44, 45) becomes unnecessary depending on a high/low signal level in the output of the analogue-digital conversion circuit 41.

Figure 4:
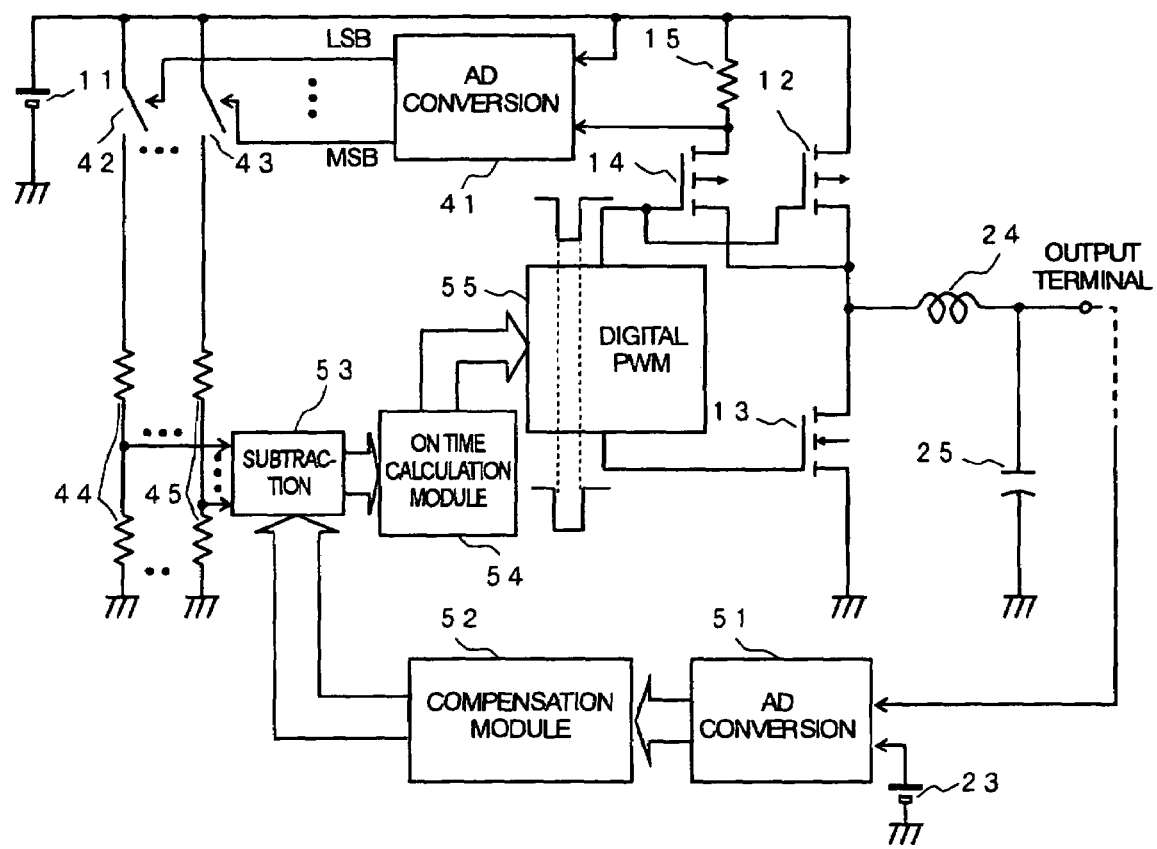
FIG. 4 is a circuit (partial block) diagram showing a configuration of a DC-DC converter relating to yet another embodiment of the present invention.

Next, the DC-DC converter according to yet another embodiment of the present invention will be explained with reference to FIG. 4. FIG. 4 is a circuit (partial block) diagram showing a configuration of the DC-DC converter according to yet another embodiment of the present invention. In FIG. 4, the same symbols and numbers are put to elements already explained, and explanation thereof will be omitted.

A difference between the present embodiment and that shown in FIG. 3 is using a digital PWM (pulse with modulation) module 55 in place of the ON/OFF control signal generation circuit 20 having a set/reset input, and accordingly, an analogue-digital conversion circuit 51, a compensation module 52, a subtractor 53 and an ON-time calculation module 54 are provided in place of the error amplification circuit 22 and the comparator 19.

The digital PWM module 55 outputs signals having the same timing as the ON/OFF control signal generation circuit 20 in the above-described respective embodiments as a signal outputted to both gates of the p-channel MOSFET 12 and the p-channel MOSFET 14, and as a signal outputted to a gate of the n-channel MOSFET 13. The resolution in ON/OFF of the output in a time direction is to be considerably large comparing with a cycle corresponding to a switching frequency of the p-channel MOSFET 12 or the like (For example, when the switching frequency is 1 MHz, the resolution in the time direction is 100 ps. It is also possible to ensure such resolution in the time direction by providing a frequency multiplier inside.).

A digital signal inputted into the digital PWM module 55 is generated as follows. First, voltage on the output side of the DC-DC converter shown in FIG. 4 is compared with voltage of the reference voltage source 23, and a result signal of the comparison is converted into a digital signal in the analogue-digital conversion circuit 51. Timing of analogue-digital conversion corresponds to timing of switching such of the p-channel MOSFET 12 or the like (will be described later). The digital signal of the output of the analogue-digital conversion circuit 51 is a voltage error signal between voltage of the reference voltage 23 and output side voltage of the DC-DC converter.

The outputted digital signal of the analogue-digital conversion circuit 51 is inputted into the compensation module 52, and weighted averages for respective values in a certain range in a time direction are calculated. In other words, it is a calculation with a lag unit. By providing such a lag unit, it is possible to reduce a gain in high frequency, and to plan stabilization of the feedback characteristics as a DC-DC converter, similarly to the case of analogue configurations in the above-described respective embodiments.

A digital value from the analogue-digital conversion circuit 41 side is subtracted from an output digital signal of the compensation module 52 in the subtractor 53. Note that an explanation from the analogue-digital conversion circuit 41 to an input to the subtractor 53 is similar to the explanation referring to the above-described FIG. 3. A digital output of the subtractor 53 corresponds to zero at a steady time (in other words, an output digital value of the compensation module 52 and a digital value from the analogue-digital conversion circuit 41 side are equal at a steady time).

A digital output of the subtractor 53 is transferred to the ON-time calculation module 54. The ON-time calculation module 54 calculates the timing (duty ratio) of switching of the p-channel MOSFET 12 and the like depending on a distribution of the transferred digital signal in the time direction. Dependence on the distribution in the time direction is to take dynamic characteristics into account. The ON-time calculation module 54 sends a digital signal command to the digital PWM module 55 to keep the current duty ratio as it is if the output of the subtractor 53 corresponds to zero. If the output of the subtractor 53 corresponds to something other than zero, a digital signal commanding to make the current duty ratio larger or smaller is transferred to the digital PWM module 55. The digital PWM module 55 operates according to the transferred command in a digital value.

In the present embodiment, the analogue-digital conversion timing of the analogue-digital conversion circuit 41 is desirably set to a timing before and as close as possible to the turning off of the p-channel MOSFET 12 while analogue-digital conversion timing of the analogue-digital conversion circuit 51 is desirably set to a timing before and as close as possible to the turning on of the p-channel MOSFET 12. Subtraction operation in the subtractor 53 is substantially similar operation to the comparator 19 described in FIG. 1 or the like in this case. As such a conversion timing signal required by the analogue-digital conversion circuits 41 and 51, those generated by, for example, the digital PWM module 55 can be used though they are not shown.

The present embodiment can perform circuit integration on the same chip together with the p-channel MOSFET 12 or the like though including many digital processing portions. In other words, it is a favorable embodiment as a semiconductor manufacturing process. Furthermore, it is possible to improve the anti-noise characteristic more than an analogue configuration. Further, if a computation parameter inside the compensation module 52 is dynamically changed, it becomes possible to perform complicated control, and thereby improvement of frequency characteristics, in other words, improvement of load response.

In the above respective embodiments, the p-channel MOSFET 12, and the P-channel MOSFET 14 are cited as the first and second switching elements respectively. It is also possible to replace these with n-channel MOSFETs in nearly the same connecting relation. Also in this case, the current detection resistance 15 can be provided on a side of the primary supply source 11. The ON/OFF control signal to their gates becomes reversed in high/low compared with the case of the above-described respective embodiments.

The present invention is understood to be not limited to specific embodiments described here with drawings, but to contain all modifications within the range of the following claims.

What is claimed is:

1. A DC-DC converter, comprising:
 a first switching element configured to ON/OFF control a current fed from a primary side to a secondary side;
 a second switching element provided in parallel to the first switching element, configured to be controlled at a substantially same timing as an ON/OFF timing of the first switching element, and being lower in current rating than the first switching element;
 a resistance having one end and another end, the one end being connected with a node of a primary side of the second switching element, and the other end being connected with the primary side of the first switching element;
 a third switching element connected between a node of the secondary side of the first switching element and a ground and configured to be capable of being ON/OFF controlled in nearly reverse phase to the ON/OFF timing of the first switching element; and
 a shutdown timing signal generation circuit configured to generate a signal transferring the first switching element and the second switching element to an off state, based on a voltage developed across the resistance.

2. The DC-DC converter according to claim 1, further comprising:
 a voltage detection circuit configured to detect the voltage developed across the resistance relative to a voltage of the primary side of the first switching element;
 a voltage-current conversion circuit generating a current according to a magnitude of the detected voltage; and
 a current-voltage conversion circuit generating, according to a magnitude of the generated current, a voltage from a reference voltage,
 wherein the shutdown timing signal generation circuit is connected to the current-voltage conversion circuit, and configured to generate the signal transferring the first switching element and the second switching element to the off state when the generated voltage reaches a prescribed voltage.

3. The DC-DC converter according to claim 2, wherein the reference voltage is a ground voltage.

4. The DC-DC converter according to claim 2, wherein the current-voltage conversion circuit is a resistor connected between the voltage-current conversion circuit and the reference voltage.

5. The DC-DC converter according to claim 2, further comprising:
 a noise detection circuit configured to detect a noise voltage generated on a path from an input side of the voltage detection circuit to an output of the current-voltage conversion circuit via the voltage-current conversion circuit; and
 a voltage correction circuit configured to correct the voltage generated by the current-voltage conversion circuit with the noise voltage generated by the noise detection circuit and to conduct the corrected voltage to the shutdown timing signal generation circuit.

6. The DC-DC converter according to claim 2, further comprising:
 a first dummy circuit provided in a vicinity of the voltage detection circuit and having a substantially same configuration as the voltage detection circuit;
 a second dummy circuit provided in a vicinity of the voltage-current conversion circuit, having a substantially same configuration as the voltage-current conversion circuit, and connected to the first dummy circuit modeled after a connection relation between the voltage detection circuit and the voltage-current conversion circuit;

a third dummy circuit provided in a vicinity of the current-voltage conversion circuit, having a substantially same configuration as the current-voltage conversion circuit, and connected to the second dummy circuit modeled after a connection relation between the voltage-current conversion circuit and the current-voltage conversion circuit; and a voltage correction circuit configured to correct the voltage generated by the current-voltage conversion circuit with a voltage generated by the third dummy circuit and to conduct the corrected voltage to the shutdown timing signal generation circuit.

7. The DC-DC converter according to claim 6, wherein the voltage detection circuit and the first dummy circuit each is a differential amplification circuit having differential input ends, wherein to the differential input ends of the voltage detection circuit the voltage developed across the resistance is supplied, and wherein to the differential input ends of the first dummy circuit a voltage of the primary side of the first switching element is supplied in common.

8. The DC-DC converter according to claim 1, wherein both the first switching element and the second switching element are p-channel MOSFETs and drains thereof are connected to the secondary side.

9. The DC-DC converter according to claim 1, wherein both the first switching element and the second switching element are MOSFETs and a difference in the current rating is defined by channel widths thereof.

10. The DC-DC converter according to claim 1, further comprising:

an analogue-digital conversion circuit configured to sense the voltage developed across the resistance with reference to a voltage of the primary side of the first switching element as a digital value; and a digital-analogue conversion circuit converting the digital value to an analogue signal, wherein the shutdown timing signal generation circuit is connected to the digital-analogue conversion circuit, and configured to generate the signal transferring the first switching element and the second switching element to the off state when the analogue signal reaches a prescribed voltage.

11. The DC-DC converter according to claim 10, further comprising:

a level shift circuit to level shift an output signal of the analogue-digital conversion circuit representing the digital value, wherein the digital-analogue conversion circuit performs digital-analogue conversion of a signal obtained by the level shift.

12. The DC-DC converter according to claim 11, wherein the level shift circuit performs the level shift, in each of bit signal units, of the output signal of the analog-digital conversion circuit representing the digital value.

13. The DC-DC converter according to claim 11, wherein the level shift of the level shift circuit is a level shift to a level having a reference voltage.

14. The DC-DC converter according to claim 13, wherein the reference voltage is a ground voltage.

15. A DC-DC converter comprising:

a first switching element configured to ON/OFF control a current fed from a primary side to a secondary side;

a second switching element provided in parallel to the first switching element, configured to be controlled at a substantially same timing as an ON/OFF timing of the first switching element, and being lower in current rating than the first switching element;

a resistance having one end and another end, the one end being connected with a node of a primary side of the second switching element, and the other end being connected with the primary side of the first switching element;

a first analogue-digital conversion circuit configured to sense a voltage developed across the resistance with reference to a voltage of the primary side of the first switching element as a first digital value;

a second analogue-digital conversion circuit configured to compare a voltage of output side of the DC-DC converter with a reference voltage to perform analogue-digital conversion of a comparison result signal, and to output a second digital value;

a compensation module configured to output a third digital value by weighing addition of the second digital value in a time direction;

a subtractor subtracting the first digital value from the third digital value to output a subtracted value;

an ON-time calculation module configured to determine a value of a duty ratio to turn the first switching element and the second switching element on, based on a distribution in the time direction of the subtracted value; and a digital PWM module configured to ON/OFF control the first switching element and the second switching element based on the value of the duty ratio.

16. The DC-DC converter according to claim 15, further comprising:

a level shift circuit to level shift an output signal of the first analogue-digital conversion circuit representing the first digital value, wherein the subtractor outputs the subtracted value obtained by subtracting a signal obtained by the level shift from the third digital value.

17. The DC-DC converter according to claim 16, wherein the level shift of the level shift circuit is a level shift to a level having a reference voltage.

18. The DC-DC converter according to claim 17, wherein the reference voltage is a ground voltage.

* * * * *